E. A. PARKER.
TEA AND COFFEE POT.
No. 176,676            Patented April 25, 1876.
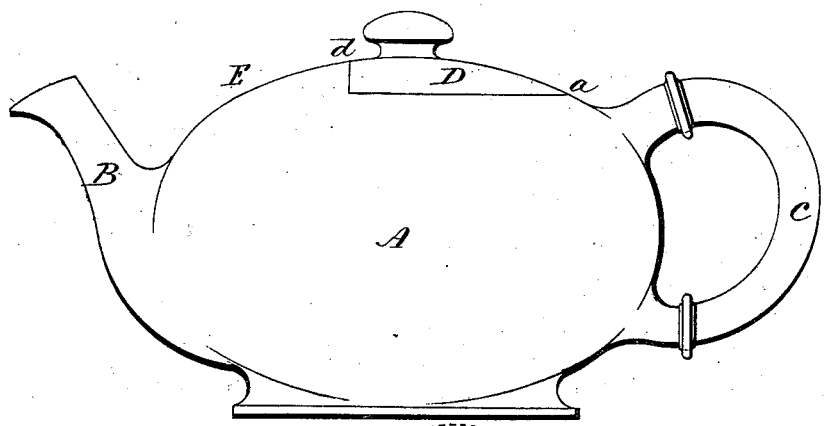
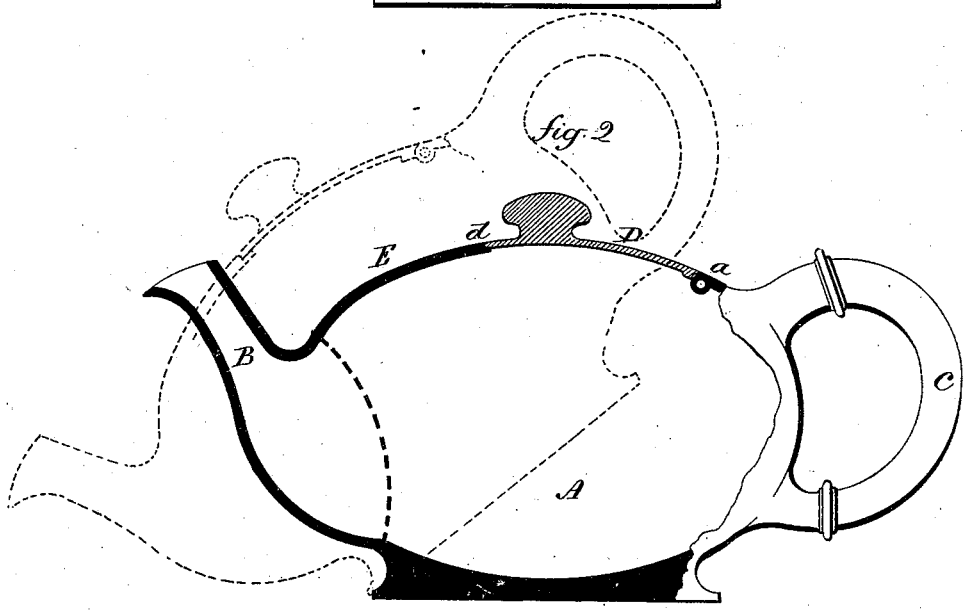

UNITED STATES PATENT OFFICE.

EDMUND A. PARKER, OF WEST MERIDEN, CONNECTICUT, ASSIGNOR TO THE MERIDEN BRITANNIA COMPANY, OF SAME PLACE.

IMPROVEMENT IN TEA AND COFFEE POTS.

Specification forming part of Letters Patent No. 176,676, dated April 25, 1876; application filed January 31, 1876.

*To all whom it may concern:*

Be it known that I, EDMUND A. PARKER, of West Meriden, in the county of New Haven and State of Connecticut, have invented a new Improvement in Tea and Coffee Pots; and I do hereby declare the following, when taken in connection with the accompanying drawings and the letters of reference marked thereon, to be a full, clear, and exact description of the same, and which said drawings constitute part of this specification, and represent, in—

Figure 1, side view; Fig. 2, vertical central section.

This invention relates to an improvement in that class of tea and coffee pots which are commonly called "individual," and such as used in hotels and eating-houses.

As usually constructed, if the pot be full, as it generally is when brought upon the table, the contents overflow around the cover when the pot is tipped, as in the act of pouring.

The object of this invention is to construct a pot so as to avoid this difficulty; and it consists in arranging the cover eccentric to the vertical axis of the pot—that is, so far to the rear as to allow a portion of the top, between the cover and the forward edge or spout, to remain solid, and thereby form a guard to prevent the overflow, as more fully hereinafter described.

A is the pot, B the spout, and C the handle, which may be of any of the usual forms; D, the cover, hinged near the handle, as at $a$, and extending forward but part of the way to the opposite side, say to the point $d$, thus making the cover eccentric to the vertical axis of the body of the pot—that is, the opening of the cover shall be nearer to the handle than to the spout side, and so that a portion, E, of the top, between the cover and the spout, will remain as a stationary part of the body; hence, when the pot is tipped, as for the purpose of pouring, the contents will flow against the stationary part E of the top, but not able to reach the cover-opening, hence cannot overflow, and the difficulty referred to is thereby avoided.

I claim—

In tea and coffee pots, the arrangement of the cover eccentric to and in rear of the vertical axis of the body of the pot, and so as to form a guard, E, on the top, forward of the cover, substantially as specified.

EDMUND A. PARKER.

Witnesses:
GEO. R. CURTIS,
C. H. FISK.